US008596222B1

(12) United States Patent
Campbell et al.

(10) Patent No.: US 8,596,222 B1
(45) Date of Patent: Dec. 3, 2013

(54) COLLAPSIBLE ANIMAL CONTAINER

(76) Inventors: Talbert H Campbell, Florence, SC (US); Benjamin Stephen Chinnes, Florence, SC (US)

( * ) Notice: Subject to any disclaimer, the term of this patent is extended or adjusted under 35 U.S.C. 154(b) by 0 days.

(21) Appl. No.: 13/507,082

(22) Filed: Jun. 4, 2012

(51) Int. Cl.
*A01K 1/03* (2006.01)

(52) U.S. Cl.
USPC ............................................ 119/498; 119/474

(58) Field of Classification Search
USPC .......................... 119/498, 461, 431, 474, 513
See application file for complete search history.

(56) References Cited

U.S. PATENT DOCUMENTS

| | | | | | |
|---|---|---|---|---|---|
| 1,093,873 | A | * | 4/1914 | Mitchell | 220/8 |
| 1,790,045 | A | * | 1/1931 | Harvey | 119/52.1 |
| 2,620,588 | A | * | 12/1952 | Critser | 43/55 |
| 2,880,902 | A | | 4/1959 | Olsen | |
| 3,471,058 | A | * | 10/1969 | Latham et al. | 222/92 |
| 4,204,500 | A | * | 5/1980 | Podjan | 119/57.8 |
| 4,207,993 | A | | 6/1980 | Ellis, Sr. et al. | |
| 4,624,382 | A | * | 11/1986 | Tontarelli | 220/8 |
| 4,940,138 | A | * | 7/1990 | Hornstein | 206/218 |
| 4,974,265 | A | * | 12/1990 | Maggio | 4/449 |
| 4,978,021 | A | * | 12/1990 | Mini et al. | 220/8 |
| D332,203 | S | * | 1/1993 | Fernandez-Guthrie | D7/512 |
| 5,862,932 | A | * | 1/1999 | Walsh et al. | 220/8 |
| 6,129,051 | A | | 10/2000 | Jessie et al. | |
| 6,427,629 | B1 | * | 8/2002 | Lush | 119/52.1 |
| 6,666,329 | B1 | * | 12/2003 | Charbonneau | 206/218 |
| 6,814,279 | B2 | | 11/2004 | Jochens | |
| 6,866,004 | B1 | * | 3/2005 | Lush | 119/52.1 |
| 7,032,538 | B1 | * | 4/2006 | Lush | 119/52.1 |
| D544,303 | S | * | 6/2007 | Strepkoff | D7/512 |
| 7,484,475 | B2 | * | 2/2009 | Milliner | 119/52.1 |
| 7,506,611 | B1 | * | 3/2009 | Lush | 119/52.1 |
| D668,148 | S | * | 10/2012 | Sory | D9/436 |

OTHER PUBLICATIONS

Picture of non-collapsible cricket tube made by Plano Manufacturing.
Picture of non-collapsible cricket tube made by Challenge Fishing.
Picture of non-collapsible cricket tube made by South Bend Company.

* cited by examiner

*Primary Examiner* — Yvonne Abbott

(57) ABSTRACT

A collapsible air-permeable animal container enclosing a volume between 8 cubic inches and 768 cubic inches in its expanded state is disclosed. In one embodiment, the container can be assembled from a plurality of nesting tubular frusta, one frustum serving as a base tube and another frustum serving as a top tube. The top tube can nest substantially inside the base tube when the container is in a collapsed configuration and the top tube can be locked into place relative to the base tube when the container is in an expanded configuration. The container may also include a base cap attached to the base tube that can be opened to add or remove an animal stored in the container and closed to prevent the container contents from escaping.

20 Claims, 10 Drawing Sheets

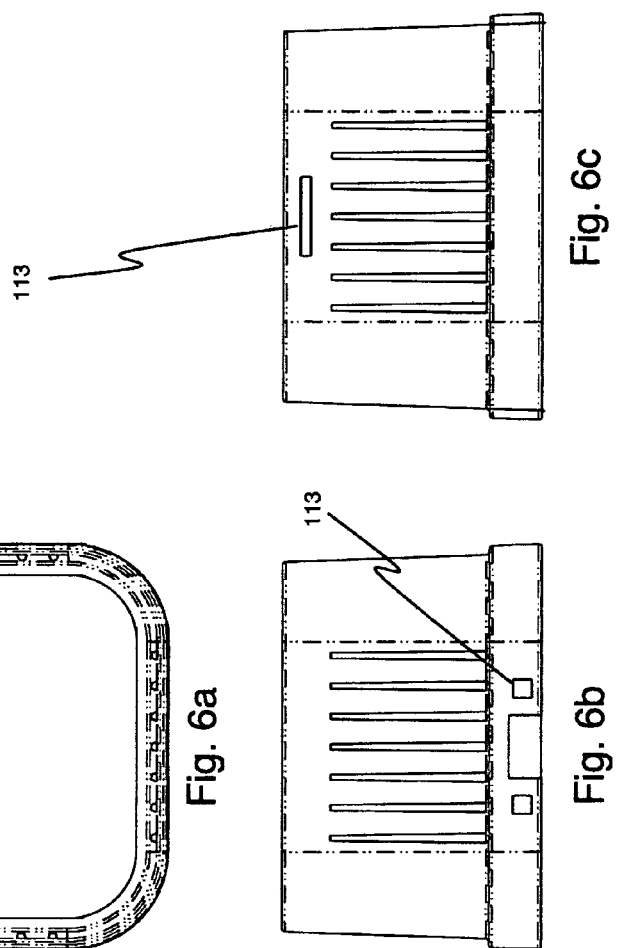

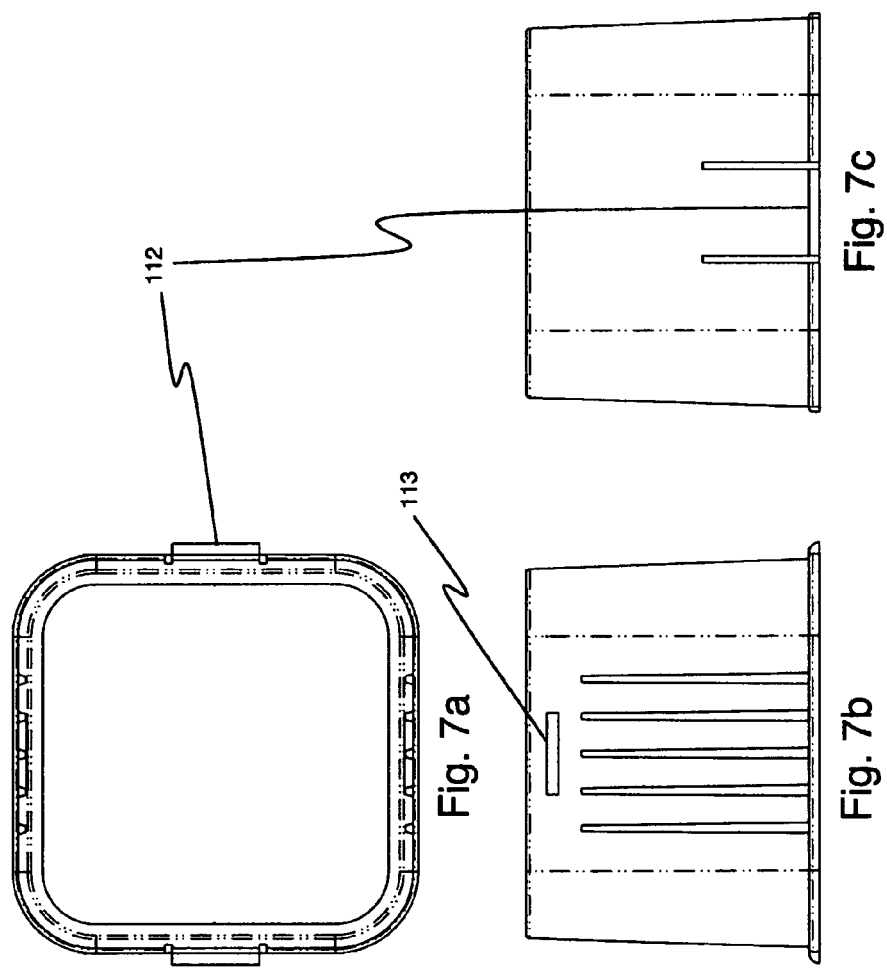

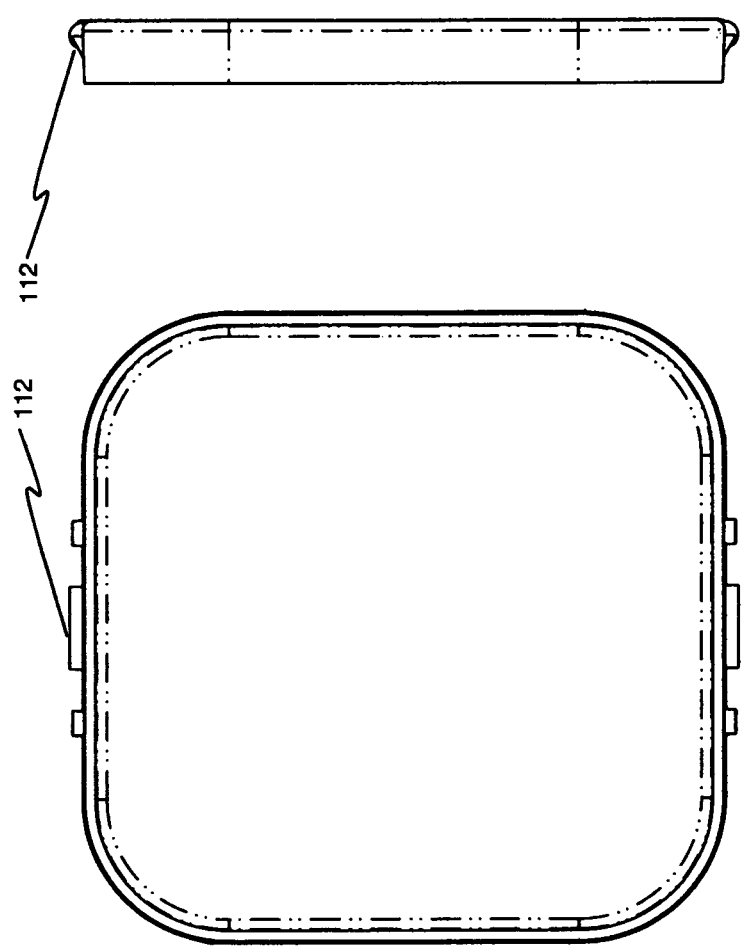

COLLAPSIBLE ANIMAL CONTAINER

No related U.S. or foreign application data.

BACKGROUND OF THE DISCLOSURE

This disclosure relates to a container, and more particularly to a collapsible container suitable for the storage and dispensing of small animals such as crickets, similar-sized insects, mice, rats, lizards, etc.

Children like to catch insects and then need a place to put them. Insects, such as crickets are used as bait for fishing. One may not know that a container is needed until the time the small animals to be stored are encountered. It is convenient to have a container that requires little space when not in use and can therefore always be at hand in a purse or fishing tackle box, to be expanded to its regular size when needed. It is desired that the container be durable. It is also desirable for the container to be inexpensive so customers purchase them "on spec" in case animal storage is needed.

Desired attributes for such a collapsible container can include:
(a) the empty collapsed configuration of the container occupies significantly less space than when the container is in its expanded configuration, used to store animals;
(b) the process of converting from collapsed to expanded configuration is easy and intuitive for a user;
(c) all components used to make the container are made of the same material and the same manufacturing process-reducing production cost and manufacturing complexity;
(d) all components used to make the container can be made using a high-volume production process such as plastic injection molding;
(e) the production process for the container directly creates porous openings for viewing the animals and venting without needing secondary operations to add holes;
(f) the container is made of materials that have a specific gravity less that 1.0, so the container will float in water; and
(g) the container is made of materials whose structural properties are unaffected by moisture.

SUMMARY OF THE INVENTION

The present invention comprises a rigid container that may include the following features:
(a) the container can be constructed from concentric rigid tapered nested annuli of any cross-sectional shape including circles, squares, or other polygons;
(b) the annuli can be made of an injection molded plastic or other material that can be cost-effectively mass produced;
(c) the annuli can include vents that allow the occupants of the container to breathe;
(d) the container can have an opening at the small end of its tapered shape that is small enough to be used to pour out animals individually or for dropping in food;
(e) the individual annuli can include snaps or other retaining member that allow the container to maintain its extended volume;
(f) the container may have an openable base that facilitates loading of batches of animals by pouring them from another container or for loading larger animals such as mice or lizards;
(g) when the openable base is open, the container can be used as a net to go over an animal on a flat surface and trap it; and/or
(h) the rigid container can be constructed without using any fabric or other flexible mesh.

In one embodiment, the container is a cricket basket having a collapsed height of approximately 3.25 inches and width and depth of approximately 4×4 inches—so as to fit into a fishing tackle box. In this embodiment, the collapsed height is somewhere in the range from 10% to 70% of the expanded height.

BRIEF DESCRIPTION OF THE DRAWINGS

The present disclosure is described in conjunction with the appended figures in which:

FIG. 6a, FIG. 6b, and FIG. 6c show a top, front and right view of a base tube for a collapsible container;

FIG. 7a, FIG. 7b, and FIG. 7c show a top, front and right view of an expansion tube for a collapsible container;

FIG. 9a and FIG. 9b show a top and side view of a base cap for a collapsible container;

In the appended figures, similar components and/or features may have the same reference label. For items with the same reference label, the description is applicable to any one of the similar components.

DETAILED DESCRIPTION OF THE PREFERRED EMBODIMENT

In the following description, specific details are set forth in order to provide a clear and thorough understanding of the invention. The examples and figures displayed hereafter aim to illustrate the different functionalities associated with the invention, and demonstrate the extent by which the invention can be implemented.

The purpose for the present invention is to enable a person to have a simple low cost container for storing animals, such as crickets, when engaging in activities such as bug catching and fishing.

Figure 1:
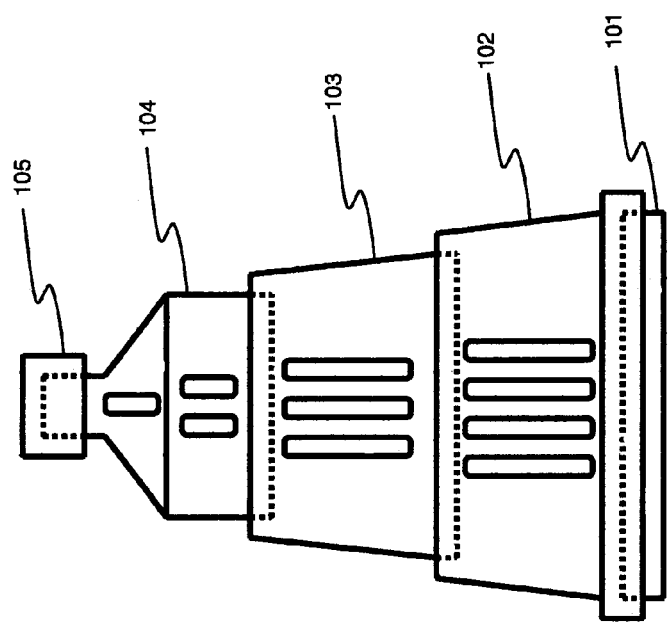
FIG. 1 is a side view of a collapsible container in its expanded state.
Figure 2:
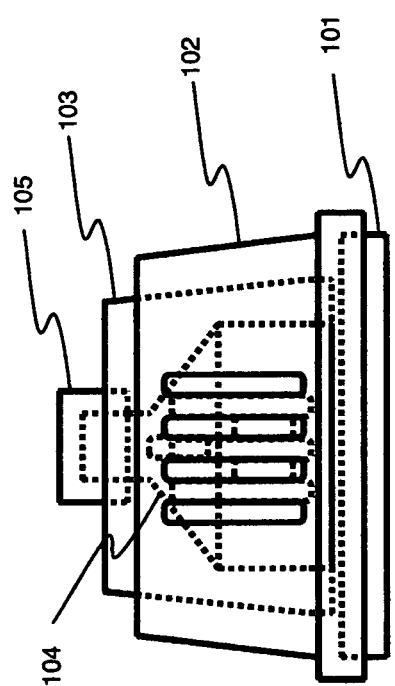
FIG. 2 is a side view of a collapsible container in its collapsed state.

FIG. 1 illustrates an embodiment of a collapsible animal container (also known as a holder or enclosure) 100 in its expanded state. FIG. 2 illustrates this embodiment 100 in its collapsed state. Referring to FIG. 1 and FIG. 2, the container 100 comprises a base cap, shown at 101, a base tube, shown at 102, an expansion tube, shown at 103, a top tube, shown at 104, and a top cap, shown at 105. In this embodiment, the base tube 102, expansion tube 103, and top tube 104 have the general shape of square tubular pyramidal frustums that can nest inside one another when collapsed with the top tube 104 nesting inside of the expansion tube 103 which nests inside the base tube 102. In this embodiment, the container 100 comprises three frustumal tubes (or frusta). In a simpler embodiment, the collapsible container could comprise only two tubes, a top tube 104 that nests and fits directly inside a base tube 102 with no need for an expansion tube. In another embodiment the there can be a plurality of expansion tubes 103, each slightly smaller than the one below it to increase the ratio between the height of the container 100 in expanded state versus its collapsed state. It should also be noted that the frustumal tubes do not necessarily need to be square frustumal tubes. They could also be conical frustumal tubes or any of a variety of pyramidal frustumal tubes such as triangular pyramidal frustumal tubes, rectangular pyramidal frustumal tubes, pentagonal pyramidal frustumal tubes, hexagonal frustumal tubes, or any other nesting tubular shape capable of being understood by someone skilled in the art.

Also shown in FIG. 1 and FIG. 2, the base cap 101 attaches to the base tube 102 and can be opened to provide a large space to facilitate the placement or removal of lizards, small mice, large insects, or a large quantity of insects at the same time into or from the container 100. The top cap 105 attaches to the top tube 104 and allows animals to be poured out of the container 100 in small quantities. This opening in the top cap can also be used to drop food into the container. Further shown in FIG. 1 and FIG. 2, the collapsed height of the container is less than 70% of the expanded height and greater than 10% of the expanded height.

The collapsible enclosure shown in FIG. 1 and FIG. 2, is designed for small animals, such as insects, mice, rats, lizards and other animals of approximately this size. In its expanded state, a typical minimal overall size for the enclosure would be a length of 2 inches, a width of 2 inches and a depth of 2 inches, giving a total volume, when expanded, of 8 cubic inches. This would be sufficient for storing a small quantity of smaller animals, such as crickets. In its expanded state, a typical maximum overall size for the enclosure would be a length of 8 inches, a width of 8 inches and a height of 12 inches, giving a total volume, when expanded of 768 cubic inches. For reference, a typical cricket is between '/4 inch and 2 inches long and has a width and height approximately ½ that of its length. Lizards, mice, and similar small animals are larger. The container can be designed to accommodate animals up to 4 inches in length.

Figure 3:
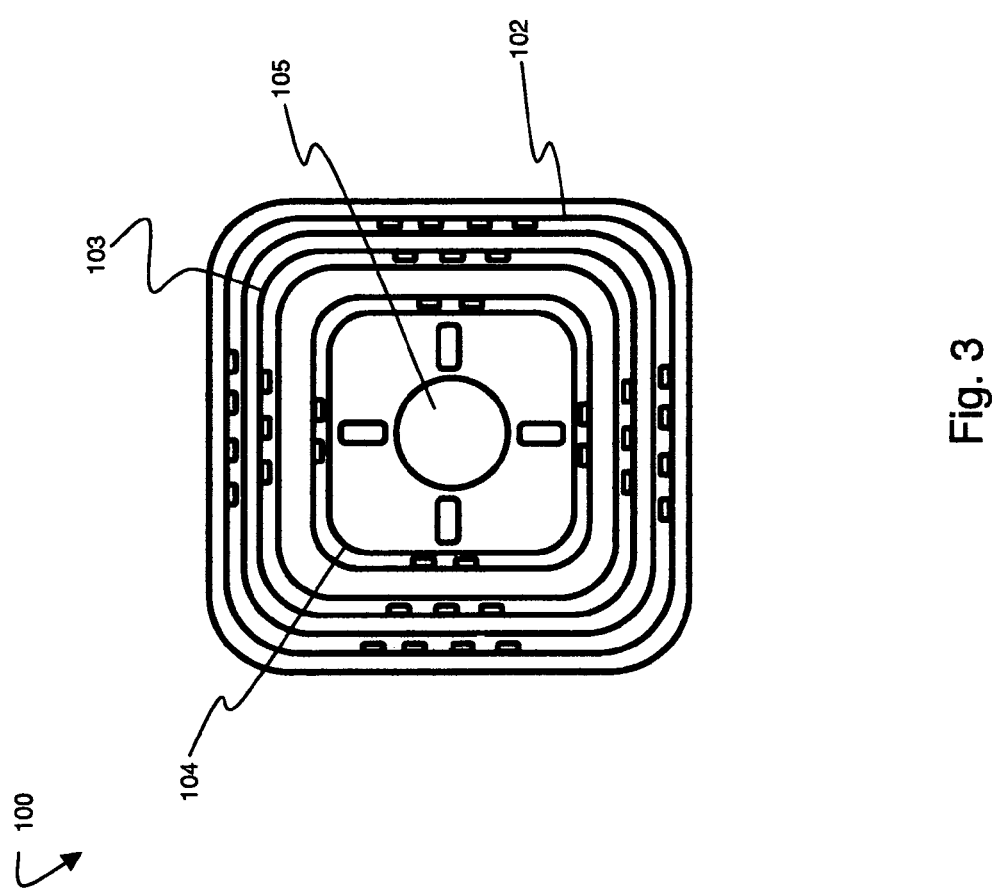
FIG. 3 is a top view of a collapsible container.

FIG. 3 provides a top view of the embodiment of the container 100 previously shown in FIG. 1 and FIG. 2. In this view, one can see how the top tube 104 nests in the expansion tube 103, which nests in the base tube 102. As a reference dimension, the size of the small opening at the top of the assembly is designed to allow individual cricket-sized animals to be poured from the container or for food to be dropped into the container. Given the dimensions of a typical cricket, or other small animal for which this container is intended, this means the opening in the top of the assembly has a cross sectional area of between 0.1 square inches (approximately 0.4 inches in diameter if round) and 1 square inch (approximately 1.1 square inches if round).

Figure 4:
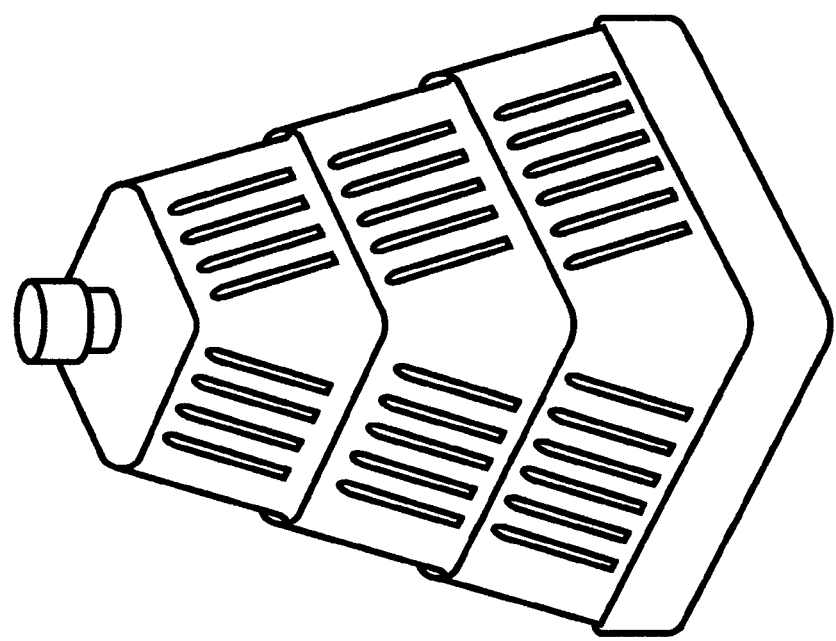
FIG. 4 is a perspective view of a prior art (not collapsible) insect holder.

FIG. 4 shows a prior art design of an insect container. This design, which was available through a company called Plano Molding in Plano, Ill., is not collapsible. The entire pyramidal structure is a single injection-molded plastic piece with a separate plastic top cap and plastic base.

Figure 5:
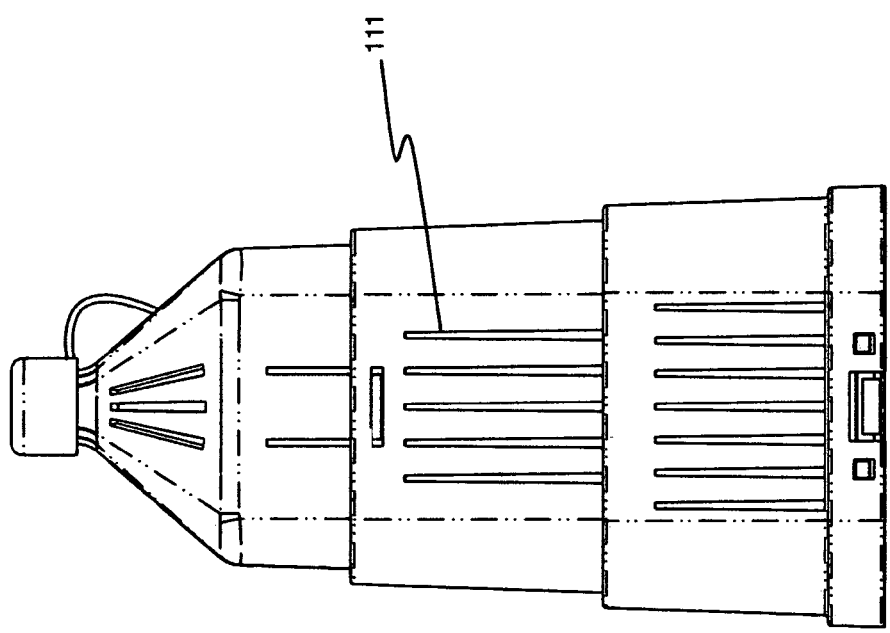
FIG. 5 is a side view of a collapsible container depicting the use of snaps and a retaining feature for the cap.

FIG. 5 illustrates a slightly different embodiment of the present invention in which the vent holes (shown at 111) are tapered for manufacturing expediency. Tapered holes like this can be made using an injection mold that does not need complex actions in a direction perpendicular to the direction the mold opens. The details of how this is done are capable of being understood by anyone skilled in the art of plastic injection mold design.

Figure 8C:
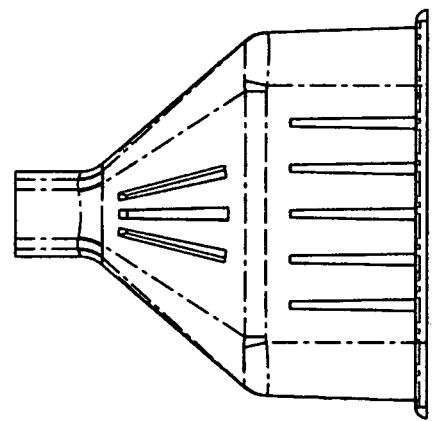
FIG. 8a, FIG. 8b, and FIG. 8c show a top, front and right view of a top tube for a collapsible container.
Figure 8A:
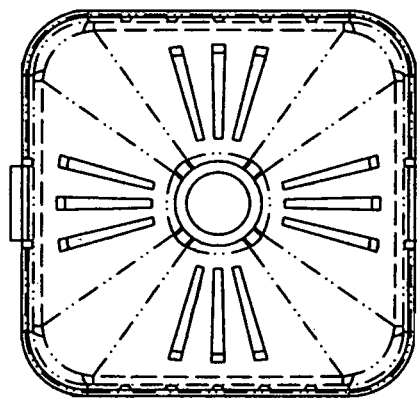
Figure 8B:
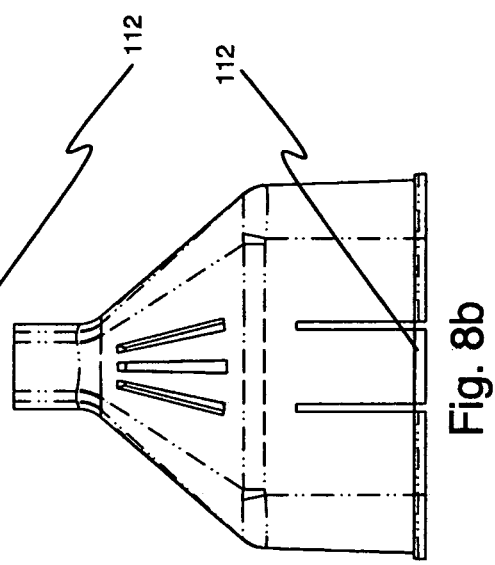
Figure 10A:
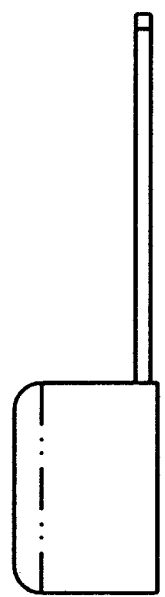
FIG. 10a and FIG. 10b depict a side and top view of a top cap for a collapsible container.
Figure 10B:
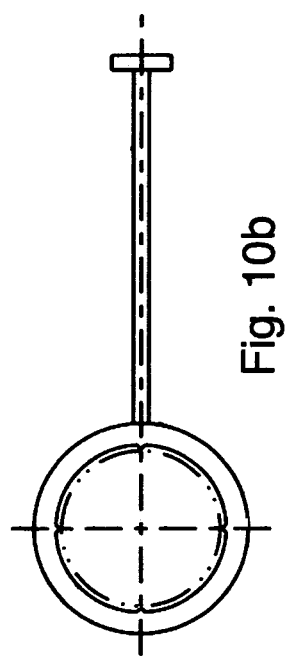

FIG. 6 illustrates three orthogonal views of the base tube for the container shown in FIG. 5. FIG. 7 illustrates three orthogonal views of the expansion tube for the container shown in FIG. 5. FIG. 8 illustrates three orthogonal views of the top tube for the container shown in FIG. 5. FIG. 9 illustrates two views of the base cap for container shown in FIG. 5. FIG. 10 illustrates two views of the top cap for container shown in FIG. 5.

FIG. 5, FIG. 6, FIG. 7, FIG. 8, and FIG. 9 also illustrate features that have been fabricated into the base, base tube, expansion tube, and top tube to aid in the retention of these elements in their expanded configuration. In particular, these elements incorporate snaps that engage in slots in adjacent elements to provide positive engagement that prevent the enclosure from accidentally collapsing, thereby locking one element to another. In FIG. 5, FIG. 6, FIG. 7, FIG. 8, and FIG. 9 the snaps are illustrated at 112 and the slots are illustrated at 113.

In one embodiment all elements of the collapsible holder are made of thermoplastic using an injection molding process. The making of snaps and slots of this type is well understood by those skilled in the art of plastic injection molding and the fabrication of molds (also known as tooling) for plastic injection molding. It may also be desirable to make all parts of the same type and grade of thermoplastic material as this can simplify the molding process and reduce cost. The individual elements (base, base tube, expansion tube or tubes, top tube, and cap) could either be made in separate molds or could be made in molds that produce more than one of the individual elements at the same time.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A collapsible air-permeable animal container enclosing a volume of between 8 cubic inches and 768 cubic inches in its expanded state comprising:
a plurality of nesting tubular frusta, one frustum serving as a base tube and another frustum serving as a top tube, wherein
the top tube can nest substantially inside the base tube when the container is in a collapsed configuration and the top tube is locked into place relative to the base tube when the container is in an expanded configuration; and
a base cap that can be attached from the base tube that can be opened to add or remove an animal stored in the container and closed to prevent the container contents from escaping.

2. The container of claim 1, wherein the base cap and base tube are a manufactured as a single piece.

3. The container of claim 1, wherein the base cap and base tube are a manufactured as separate pieces.

4. The container of claim 1, further comprising a top cap attached to the top tube that can be opened to access the contents of the container and closed to prevent the container contents from escaping.

5. The container of claim 4, wherein the top tube has an opening with a cross sectional area of between 0.1 square inches and 1.0 square inches that is covered by the top cap when the container is used to store animals.

6. The container of claim 1, wherein the top tube and base tube comprise vents to facilitate viewing and air circulation between the interior and exterior of the container.

7. The container of claim 1, further comprising an expansion module comprising at least one expansion tube in the form of a tubular frustum wherein:

the expansion module can nest substantially within the base tube when the container is in a collapsed configuration;

the top tube can substantially nest within the expansion module when the container is in a collapsed configuration;

expansion tubes in the expansion module nest within one another if there is more than one extension tube;

the locking into place between the top tube and the base tube comprises the locking of the expansion module to the base tube and the locking of the expansion module to the top tube; and the expansion tubes in the expansion module lock to one another when the container is in the expanded configuration.

8. The container of claim 1, wherein the collapsed height of the container is less than 70% of the expanded height of the container and greater than 10% of the expanded height of the container.

9. The container of claim 1, wherein the container does not comprise fabric.

10. The container of claim 1, wherein the container is made entirely of one type and grade of injection-moldable plastic.

11. A collapsible air permeable enclosure having an expanded height of between 2 inches and 12 inches comprising:

a plurality of nesting tubular frusta, one frustum serving as a base tube and another frustum serving as a top tube, wherein the top tube can nest substantially inside the base tube when the container is in a collapsed configuration and the top tube is locked into place relative to the base tube when the container is in an expanded configuration;

a base cap that can be attached from the base tube that can be opened to add or remove an animal stored in the container and closed to prevent the container contents from escaping; and vents in an element chosen from at least one the top tube, the base tube, and the base cap that provide venting of air between the interior and the exterior of the enclosure and wherein the vents are small enough to prevent the animals being stored from escaping.

12. The enclosure of claim 11, further comprising a top cap attached to the top tube that can be opened to access the contents of the enclosure and closed to prevent the enclosure contents from escaping.

13. The enclosure of claim 11, further comprising an expansion module comprising at least one expansion tube in the form of a tubular frustum wherein:

the expansion module can nest substantially within the base tube when the enclosure is in a collapsed configuration;

the top tube can substantially nest within the expansion module when the enclosure is in a collapsed configuration;

expansion tubes in the expansion module nest within one another if there is more than one extension tube;

the locking into place between the top tube and the base tube comprises the locking of the expansion module to the base tube and the locking of the expansion module to the top tube; and the expansion tubes in the expansion module lock to one another when the enclosure is in the expanded configuration.

14. The enclosure of claim 11, wherein the collapsed height of the enclosure is less than 70% of the expanded height of the enclosure and greater than 10% of the expanded height of the enclosure.

15. The enclosure of claim 11, wherein the top tube and base tube comprise vents to facilitate viewing and air circulation between the interior and exterior of the enclosure.

16. The enclosure of claim 11, wherein the interior volume of the enclosure is between 8 cubic inches and 768 cubic inches when the enclosure is in its expanded state.

17. A method for fabricating a collapsible storage container for animals having a length of less than four inches comprising:

fabricating a plurality of nesting tubular frusta, one frustum serving as a base tube and another frustum serving as a top tube, wherein the top tube is fabricated to nest substantially inside the base tube when the container is in a collapsed configuration and the top tube is fabricated with features that facilitate locking into place relative to the base tube when the container is in an expanded configuration, wherein fabrication of the base tube and the top tube comprises fabrication of air vents; and fabricating a base cap attached to the base tube that can be opened to access the contents of the container and closed to prevent the container contents from escaping.

18. The method of claim 17, wherein fabricating comprises plastic injection molding.

19. The method of claim 17, wherein fabricating does not comprise fabric.

20. The method of claim 17, wherein the interior volume of the container in its expanded state is between 8 cubic inches and 768 cubic inches.

\* \* \* \* \*